United States Patent [19]

Graves et al.

[11] Patent Number: 5,178,491
[45] Date of Patent: Jan. 12, 1993

[54] VAPOR-PHASE NUTRIENT DELIVERY SYSTEM FOR IN SITU BIOREMEDIATION OF SOIL

[75] Inventors: Duane A. Graves, Maryville; Maureen E. Leavitt, Knoxville, both of Tenn.

[73] Assignee: International Technology Corporation, Knoxville, Tenn.

[21] Appl. No.: 717,379

[22] Filed: Jun. 19, 1991

[51] Int. Cl.⁵ .......................... F02D 3/00; F02D 31/00
[52] U.S. Cl. ..................................... 405/128; 435/243; 435/260; 435/262; 210/610
[58] Field of Search ................ 405/128, 129; 166/246; 435/243, 244, 248, 260, 262; 210/610

[56] References Cited

U.S. PATENT DOCUMENTS

| | | | |
|---|---|---|---|
| Re. 33,102 | 10/1989 | Visser et al. | 166/267 |
| 4,401,569 | 8/1983 | Jhaveri et al. | 405/128 X |
| 4,518,399 | 5/1985 | Croskell et al. | 405/129 X |
| 4,593,760 | 6/1986 | Visser et al. | 166/267 |
| 4,660,639 | 4/1987 | Visser et al. | 166/267 |
| 4,705,633 | 11/1987 | Bogusch | 210/610 X |
| 4,749,491 | 6/1988 | Lawes et al. | 210/610 |
| 4,849,360 | 7/1989 | Norris et al. | 405/128 X |
| 4,850,745 | 7/1989 | Hater et al. | 405/128 X |
| 5,011,329 | 4/1991 | Nelson et al. | 405/128 |
| 5,017,289 | 5/1991 | Ely et al. | 405/129 X |

OTHER PUBLICATIONS

Hutzler, et al.; State of Technology Review; Jun. 1989.
Munugh, et al.; A Case History: Cleanup of a Subsurface Leak of Refined Product; Feb. 28–Mar. 3, 1983.
Sterrett, et al.; Site and Assessment and On-Site Treatment of a Pesticide Spill in the Vadose Zone.
Texas Research Institute, Inc.; Examination of Venting for Removal of Gasoline Vapors From Contaminated Soil; Mar. 1980.

*Primary Examiner*—Randolph A. Reese
*Assistant Examiner*—John A. Ricci
*Attorney, Agent, or Firm*—Luedeka, Hodges, Neely & Graham

[57] ABSTRACT

The specification discloses a system for in situ bioremediation of soil wherein nutrients are delivered in the vapor phase to the affected area of the soil for utilization by microorganisms to promote the metabolism of organic contaminants by the microorganisms.

11 Claims, 5 Drawing Sheets

VAPOR-PHASE NUTRIENT DELIVERY SYSTEM FOR IN SITU BIOREMEDIATION OF SOIL

The present invention relates to methods for the treatment of soils contaminated with organic compounds, and more particularly relates to a system for in situ bioremediation of soils by delivery of nutrients in the vapor phase to soil for utilization by microorganisms that metabolize the organic contaminants to a less objectionable form.

Bioremediation is an increasingly popular approach for treatment of matrices contaminated with organic compounds which are metabolizable by indigenous or implanted microorganisms. For example, bioremediation has been employed in the treatment of subsurface soil areas contaminated by hydrocarbons as in the case of leaking underground tanks or pipes. Bioremediation has also been used in the treatment of water-borne oil and gas contamination such as in tanker mishaps, oil well leaks and the like.

While the approach of utilizing microorganisms for remediation has enjoyed some success, there are problems with implementation of the various bioremediation methods that have been proposed. A particular problem is the fact that bioremediation methods tend to be somewhat inefficient and time-consuming in some applications as compared to other variable approaches such as chemical or thermal treatments and/or excavation or removal and disposal off site. This is especially true in the case of relatively deep subsurface soil contamination where the low level of nutrients sustains only very small populations of microorganisms capable of metabolizing contaminants, and where transport of any available nutrients to the bacteria by known means and/or migration of bacteria to the contaminant is often inhibited by the structure of the site.

Accordingly, it is an object of the present invention to provide a system for the bioremediation of soil containing organic contaminants.

It is a further object of the invention to provide a system for in situ treatment of soil containing organic contaminants that are metabolizable by microorganisms within the soil adjacent the substance.

Another object of the invention is to provide a system of the character described which enables the delivery of nutrients to the microorganisms to promote the metabolism of the contaminant by the microorganisms.

An additional object of the invention is to provide a system of the character described wherein the nutrient is more readily and rapidly dispersed into the soil.

Yet another object of the invention is to provide a system of the character described wherein the nutrient is made available to a relatively large area of the soil.

Still another object of the invention is to provide a system of the character described wherein the nutrient is provided in a form that is readily utilizable by the microorganisms.

A further object of the invention is to provide a system of the character described which is relatively uncomplicated to construct and use and which enables an efficient delivery of nutrients to the microorganisms.

These and other objects and advantages are achieved in accordance with the present invention which provides a method for in situ treatment of subsurface soil containing an organic contaminant that is metabolizable by microorganisms within the soil. In general, the invention involves providing a delivery conduit in the soil from adjacent the surface to adjacent a treatment zone of the soil containing the microorganisms and the contaminant to establish flow communication between soil in the treatment zone and a source of a gas containing a vapor-phase microbial nutrient selected from the class consisting of vapor-phase ammonia and vapor-phase phosphate compounds. A flow of the gas containing the vapor-phase microbial nutrient is then induced through the delivery conduit from the source such that the vapor-phase nutrient is emitted into soil in the treatment zone for utilization by microorganisms therein to promote the metabolism of the contaminant. In a preferred embodiment, a vapor exhaust conduit is provided in the soil from adjacent the surface so as to establish flow communication between the exhaust conduit and the adjacent soil for exhausting gas from the soil. A vacuum is established in the exhaust conduit to provide an area of reduced pressure in soil adjacent the exhaust conduit to create a zone of influence of the exhaust conduit in the soil for inducing a flow of vapors through soil through the zone of influence toward and into the exhaust conduit The exhaust conduit is positioned with respect to the delivery conduit such that the zone of influence encompasses at least a portion of the treatment zone to cause movement of gas emitted into the treatment zone from the delivery conduit toward and into the exhaust conduit.

These and other features and advantages of the invention will now be further described in the following specification with reference to the accompanying drawings in which.

Figure 8:
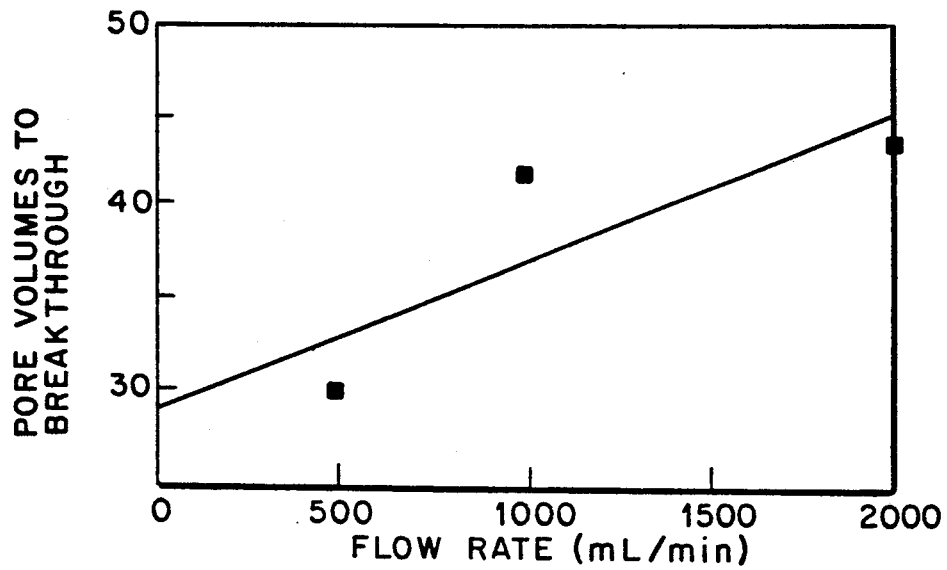
Figure 9:
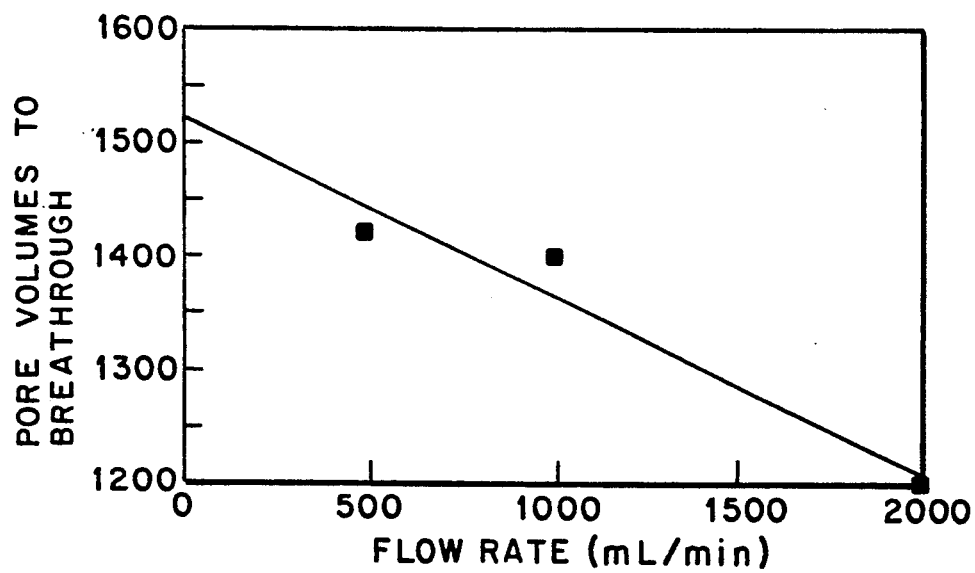

FIG. 8 is a graphical view illustrating a relationship between the amount of gas passed through the soil in terms of pore volumes until breakthrough of vapor-phase ammonia and the flow rate of the gas for dry soils treated in accordance with the invention; and FIG. 9 is a graphical view illustrating a relationship between the amount of gas passed through soil in terms of pore volumes until breakthrough of vapor-phase of ammonia and the flow rate of the gas for moist soils treated in accordance with the invention.

Figure 1:
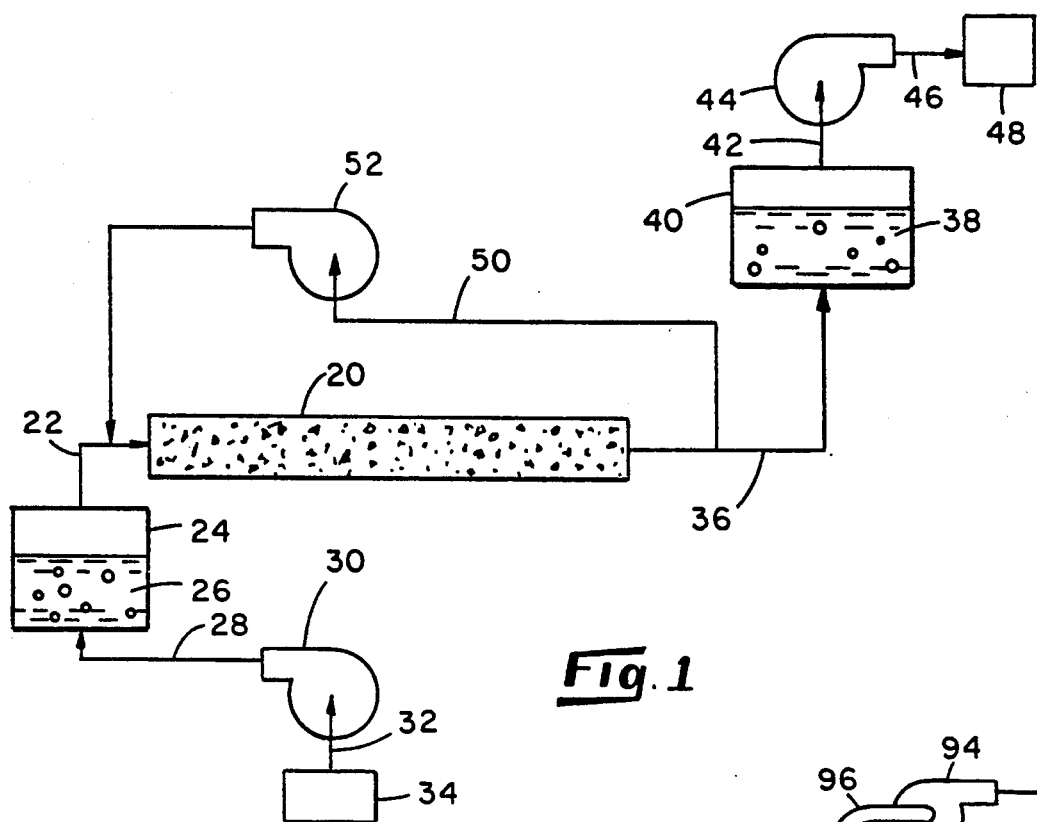
FIG. 1 is a diagrammatic view illustrating various features of the present invention for delivery of vapor-phase nutrients to soil.

With reference now to the drawings in further detail, the more general features of the invention are illustrated in the diagrammatic view of FIG. 1 wherein a soil area 20 to be treated contains an organic contaminant that is metabolizable by indigenous or implanted microorganisms within the soil. For example, the soil may contain as the organic contaminant various metabolizable hydrocarbons such as gasolines, oils and the like as well as PCBs and dioxins, which are known to be completely or partially metabolized to less offending by-products by microorganisms typically encountered in soils to considerable depths. The terminology "organic contaminant" as used herein refers to and includes any such metabolizable organic substance which is desired to be removed from the soil through bioremediation processes.

As encountered in the field, the contaminated soil may be expected to be within the so-called "vadose" zone which is the unsaturated area located generally between the surface and the water table. However, the contaminated soil may also extend into the capillary zone which is the transition between the water table and the vadose zone, and the contamination may also extend into the water table itself as in the case of a floating hydrocarbon film on the water.

In accordance with the invention, a vapor-phase nutrient contained in a carrier gas such as air is supplied as by delivery conduit 22 to the soil area 20 to stimulate the growth of microorganisms in the soil to promote the metabolism of the contaminant by the microorganisms. As used herein in connection with references to the nutrient, the term "vapor" means substantially the gaseous phase of the compound and is thus synonymous with the term "gas". Also, the term "soil" refers in a general sense to the essentially solid particulate-type matrix materials making up any contaminated area in the earth's crust that may be treated by the invention, and therefore encompasses naturally occurring materials such as sand, clay, silt, gravel, humus and the like as well as any artificial solid matrices such as glass, construction materials, concrete, slag, flyash and other such materials.

The nutrient, which is a vapor-phase form of ammonia or a phosphate compound, may be incorporated within the carrier gas by flowing the gas through one or more tanks 24 containing a solution 26 capable of liberating a vapor-phase form of the nutrient to the carrier gas. Thus, in order to provide vapor-phase ammonia within the carrier gas as a nutrient, air may be passed through a solution of ammonium hydroxide in the tank 24. To provide a vapor-phase phosphate compound, and particularly an orthophosphate moiety, the air may be passed through a solution of phosphoric acid so that the gas exiting the solution contains gas or vapor-phase orthophosphate. The air is bubbled or sparged into the solution from a conduit 28 with the assistance of a pump 30 drawing the carrier gas through conduit 32 from a source indicated at 34, which may simply be an intake drawing atmospheric air. Alternately, the vapor-phase nutrient may be incorporated within the carrier gas from a gaseous state such as from compressed gas canisters, tanks and the like.

The vapor-phase nutrient and carrier gas readily diffuse into and through the soil area 20, providing nutrients to microorganisms within the soil. By appropriate control of the rate of flow of the carrier gas and the concentration of the nutrient, a significant increase is achieved in the population of the microorganisms and an enhanced ability of the microorganisms to metabolize the contaminant to effect remediation of the area.

The carrier gas and any residual nutrient exits the soil area 20 as in conduit 36, and may be sparged or bubbled into a trap solution 38 contained in a tank 40 for stripping residual nutrient from the gas. The cleaned gas is then passed from the tank 40 via conduit 42 with the assistance of pump 44 and released to the atmosphere in conduit 46, or further treated as may be necessary as indicated at 48. The gas in conduit 36 may also be recirculated in whole or in part via conduit 50 to delivery conduit 22 with the assistance of pump 52 to reintroduce residual nutrient to the soil and improve the efficiency of the process. Depending on requirements, the recirculation may be established between various conduits before and after passage of the gas through the soil.

While the system illustrated in FIG. 1 employs two pumps 30 and 44 to provide a push/pull-type arrangement, the invention may in some applications be practiced with only a single pump either "pushing" the gas through soil as in use of the pump 30 or "pulling" the gas through the soil as in use of the pump 44. Also, in some applications the use of a stripping device such as the tank 40 and solution 38 may be omitted and the gas simply permitted to diffuse into the soil to provide the vapor-phase nutrient to the biota with no attempt at removal of the gas or vapor, or the conduit 36 with or without the pump 44 may be used simply as an exhaust.

Figure 2:
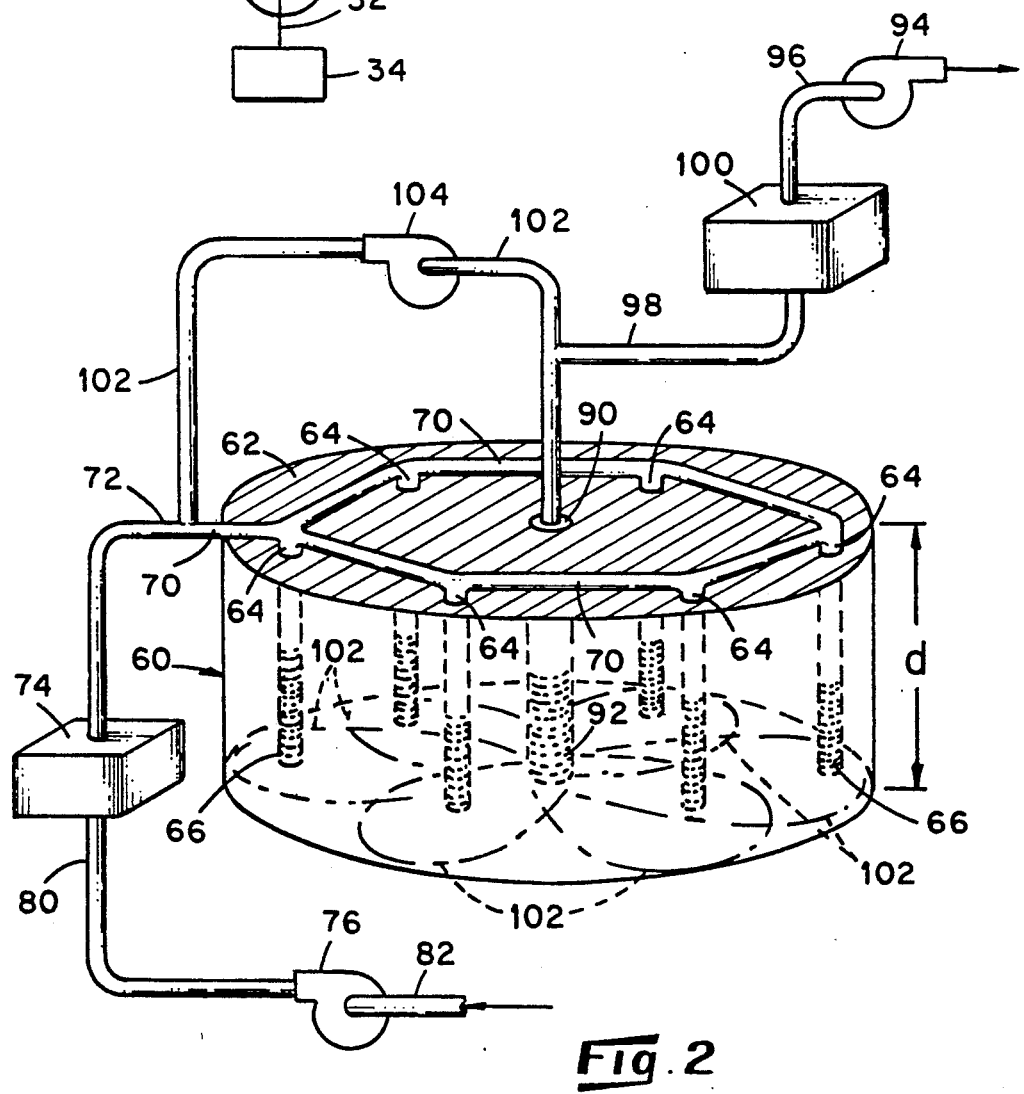
FIG. 2 is a diagrammatic view illustrating features of a preferred embodiment of the vapor-phase nutrient delivery system of the invention in an application for in situ bioremediation of soil.
Figure 3:
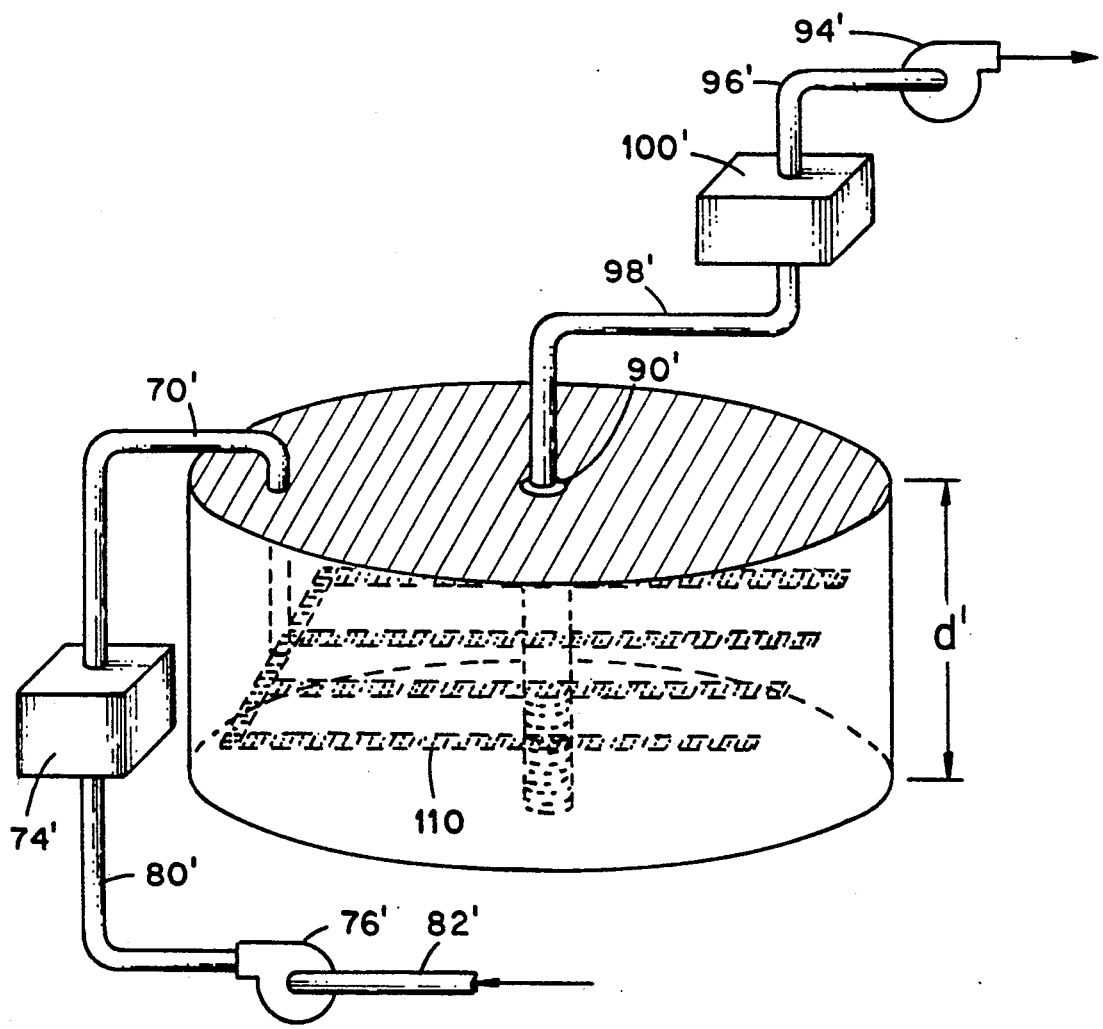
FIG. 3 is a diagrammatic view illustrating features of a further embodiment of the vapor-phase nutrient delivery system of the invention for in situ bioremediation of soil.

As specific embodiments of the invention, there are shown in FIGS. 2 and 3 two systems for distributing the vapor-phase nutrient to the soil to be treated. With initial reference to FIG. 2, a soil area 60 containing a metabolizable contaminant defines a cylindrical section extending downwardly a depth "d" from the upper surface 62 of the ground. Test wells may be drilled in advance to map out the area of contamination in terms of the width and depth of the soil and the concentration, type and distribution of microorganisms and nutrients. Depending on the configuration of the site and the area of contamination, the depth "d" may be only a few feet or it may be hundreds of feet.

Vertically oriented nutrient delivery conduits or wells 64 are established down into the soil area 60 at spaced apart locations to a depth approximately equal to the depth "d" and are perforated, slotted or otherwise configured adjacent their lower ends as at 66 for emitting gas from the wells into the surrounding soil from locations spaced well below the upper surface 62. Suitable well constructions for this purpose are described in *Handbook: Remedial Action at Waste Disposal Sites*, EPA Report No. EPA-62516-82-006 dated Mar., 1982, p. 235-282, the disclosure of which is incorporated herein by reference.

The wells 64 are interconnected by a manifold 70 which leads as by conduit 72 from a nutrient supply tank 74 and associated pump 76, providing air to the tank 74 through conduit 80 from intake conduit 82. The manifold 70 may be above the ground as shown, or it may be buried slightly below the surface 62. The nutrient supply tank 74 may contain a solution of ammonium hydroxide in the range of from about 0.1 wt. % to the highest percentage commercially available for liberating ammonia vapor to air bubbled or sparged through the solution from conduit 80. The same tank or another tank may be used to provide a solution for supplying vapor-phase phosphate to the gas entering the conduits 64 from manifold 70. For example, a solution of phosphoric acid in the range of from about 10 to about 85 wt. % may be used to provide vapor-phase orthophosphate to the carrier gas. The dosage or concentration of vapor-phase nutrient in the gas and the flow rate through the conduits 64 may be varied as necessary to achieve delivery of the required amount of nutrient to the microorganisms in the soil area 60.

A centrally located vapor exhaust conduit or well 90 exhausts vapors from the soil area 60. The exhaust well 90 may be constructed in a manner similar to the delivery wells 64 using a lower perforated or gas permeable section 92 which admits vapor into the well from the surrounding soil. A vacuum pump or suction blower 94 is connected in flow communication with the extraction well 90 through conduits 96 and 98 and tank 100 which strips any residual nutrient from the gas as described above with reference to FIG. 1. All or a portion of the gas withdrawn from the soil may be recirculated from conduit 98 to delivery conduit 70 as in conduit 102 with the assistance of pump 104.

The configuration of the exhaust well 90 including the degree of vacuum force exerted on the soil is sufficient to create a zone of influence or reduced pressure within the soil area 60 adjacent the well so as to encourage movement of any gas within the area toward the center and into the well. The delivery wells 64 in turn each emit a flow of nutrient-containing gas out into their respective adjacent soil areas. The influence of the exhaust well 90 draws the emitted gas toward the location of the well so that a tear-drop-type distribution area is achieved about each delivery well as shown by the dotted lines 102 converging together at the center like spokes of a wheel. The spacing of the delivery wells 64 with respect to one another ensures substantially complete coverage of the affected soil area 60.

Among the advantages of the embodiment of FIG. 2 is the fact that a generally lateral movement of the nutrient-laden gas is achieved through the affected soil area 60 while ensuring substantially complete coverage of a relatively large area. Also, delivery of the nutrient via radially inwardly flowing gas is advantageous in terms of the expected decreasing concentration gradient from release to exhaust as the nutrient is utilized by the microorganisms or otherwise separated from the gas by adsorption, absorption or condensation. Thus, the fact that the flows are converging toward the center will not necessarily cause an undesirable increase in the concentration of the nutrient in the direction of the extraction well 90 but instead will assist in maintaining a relatively uniform concentration over the area.

With reference now to FIG. 3, an additional embodiment of the treatment system of the invention may involve the use of a subsurface gas distribution manifold 110 of interconnected perforated pipes or conduits laid out generally under or through an affected soil area. The components of the FIG. 3 embodiment which are substantially identical to those of FIG. 2 are identified using the same reference character with a prime suffix. Thus, in the system of FIG. 3 vapor-phase nutrient enters the manifold 110 from conduit 70' leading from tank 74' which contains the solution that liberates the nutrient to carrier gas entering in conduit 76 from pump 76'. Also, the zone of influence of the exhaust well 90' extends into the affected soil area 60' which extends to a depth d' from the upper surface 62'. However, the soil areas into which the nutrient is emitted are generally horizontally arranged cylinders along the conduits of the manifold 110 and the arrangement, spacing, pressure and flow rate of the nutrient-laden gas diffusing from the conduits into the soil is such that the cylindrical areas overlap and accomplish distribution of the nutrient into the affected area. In this embodiment, the perforated portion of the exhaust well 90' may be located below the level of the manifold 110 to effect a radially and laterally inward and downward movement of the diffusing gas. This arrangement may be advantageous in relatively shallow contamination areas where the manifold pipes can be installed by excavation.

The following non-limiting examples are provided to further illustrate various aspects of the invention. Unless otherwise indicated, all temperatures are degrees Celsius and all percentages are by weight.

EXAMPLE I

Air was bubbled at room temperature through a flask containing dilute ammonium hydroxide and then conducted into another flask containing a pH 10 buffered solution. Ammonia accumulation in the second flask was observed using an ammonia-sensing electrode. A similar test was conducted using concentrated phosphoric acid. The trapping solution contained sodium bicarbonate. Orthophosphate was determined spectrophotometrically. The ammonia concentration in the ammonia trapping solution increased from 0 to 250 ppm over 90 minutes and the phosphate concentration in the orthophosphate trapping solution increased from 0 to 11,000 ppm over the same time period, demonstrating that both ammonia and orthophosphate may be transported in the vapor phase.

EXAMPLE II

To demonstrate the delivery of ammonia into soil, a 12"×⅜" column of finely divided soil weighing 25 g. was loaded into a glass column. The moisture content of the soil was approximately 15%.

Air was bubbled through a 10% aqueous solution of ammonium hydroxide, passed through the soil column, and finally bubbled into a trapping solution as described above with reference to FIG. 1. The test was run until breakthrough occurred. The ammonia source was then removed from the air supply and the soil column was purged with air until the ammonia content in the trapping buffer stabilized. The soil in the column was extruded in three sections. The ammonia content and pH were measured. Table 1 below shows the result of this test.

TABLE 1

Ammonia Transport Through a Soil Column

| Sample | Ammonia Concentration (mg/kg) | pH |
|---|---|---|
| Untreated Soil | 46 | 5.9 |
| Section 1 | 920 | 8.7 |
| Section 2 | 1155 | 8.8 |
| Section 3 | 1197 | 9.0 |

A soil column test with an 85% aqueous solution of phosphoric acid was conducted using the same setup as the ammonia test and a trapping solution containing sodium bicarbonate. The results of this test are shown below in Table 2.

TABLE 2

Orthophosphate Transport Through a Soil Column

| Sample | Orthophosphate Concentration (mg/kg) | pH |
|---|---|---|
| Untreated Soil | 1298 | 5.8 |

TABLE 2-continued

Orthophosphate Transport Through a Soil Column

| Sample | Orthophosphate Concentration (mg/kg) | pH |
| --- | --- | --- |
| Section 1 | 2368 | 5.8 |
| Section 2 | 1637 | 5.8 |
| Section 3 | 1919 | 6.0 |

EXAMPLE III

Figure 4:
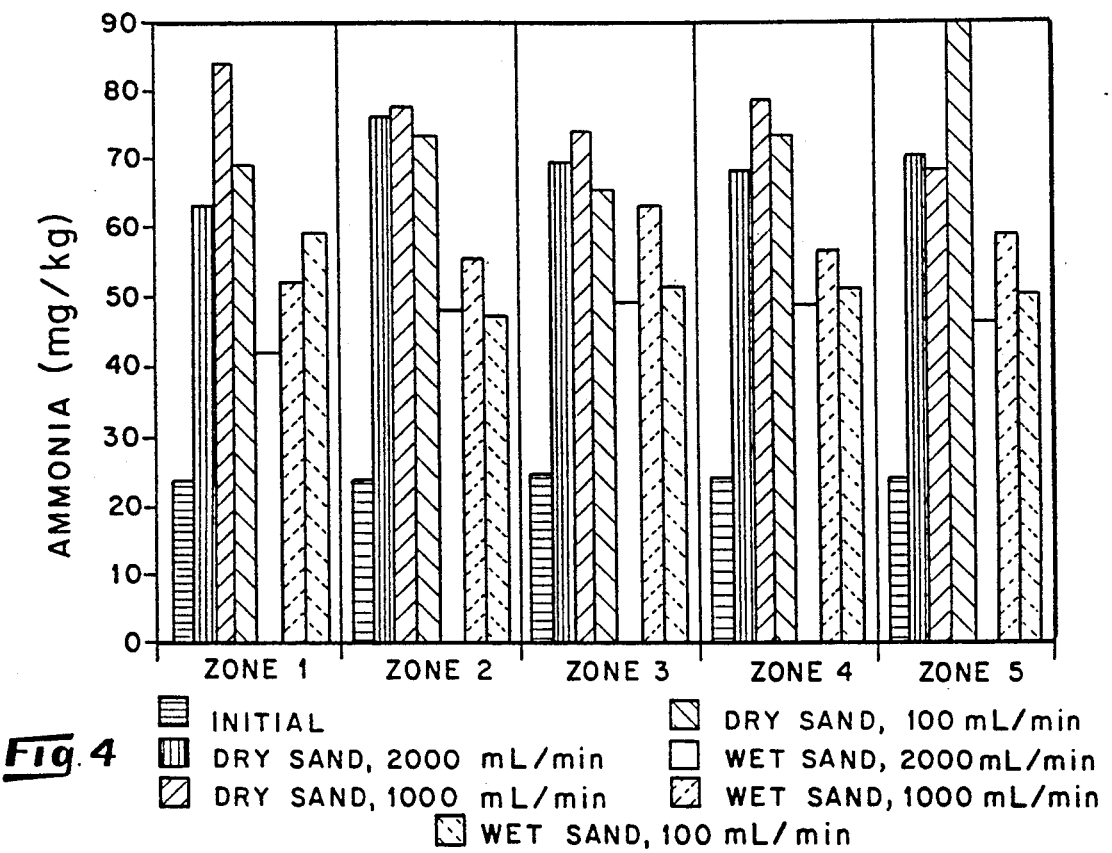
FIG. 4 is a graphical view illustrating various features of the invention related to the retention of ammonia within the treated soils.

Vapor-phase nutrient delivery to soil was demonstrated by packing 12"×2.5" glass columns with sand (about 650 mL total volume). Air was forced through the columns at three different rates, 500 mL/min., 1000 mL/min., and 2000 mL/min. Vapor-phase ammonia was supplied by bubbling air through a 10% $NH_4OH$ solution prior to its passing through the sand column. Columns were run with dry sand and with sand containing 10% moisture. Ammonia breakthrough was determined using an ammonia electrode placed in the trap as described in Example 1. After breakthrough occurred, the sand in the column was removed in either three or five discrete units. Zone 1 represents the first sample taken from the upstream side of the column with the others coming in order. The pH of the soil was measured in each case before and after the test. The soil was also extruded for measurement of the ammonia concentration. FIG. 4 shows the ammonia in the soil at breakthrough for wet and dry sand at various flow rates as compared with the initial ammonia concentration. As shown in FIG. 4, using both dry and wet (10% moisture) sand, ammonia concentrations were increased 2-to 3-fold in the sand by forcing ammonia-laden air through the sand.

Figure 5:
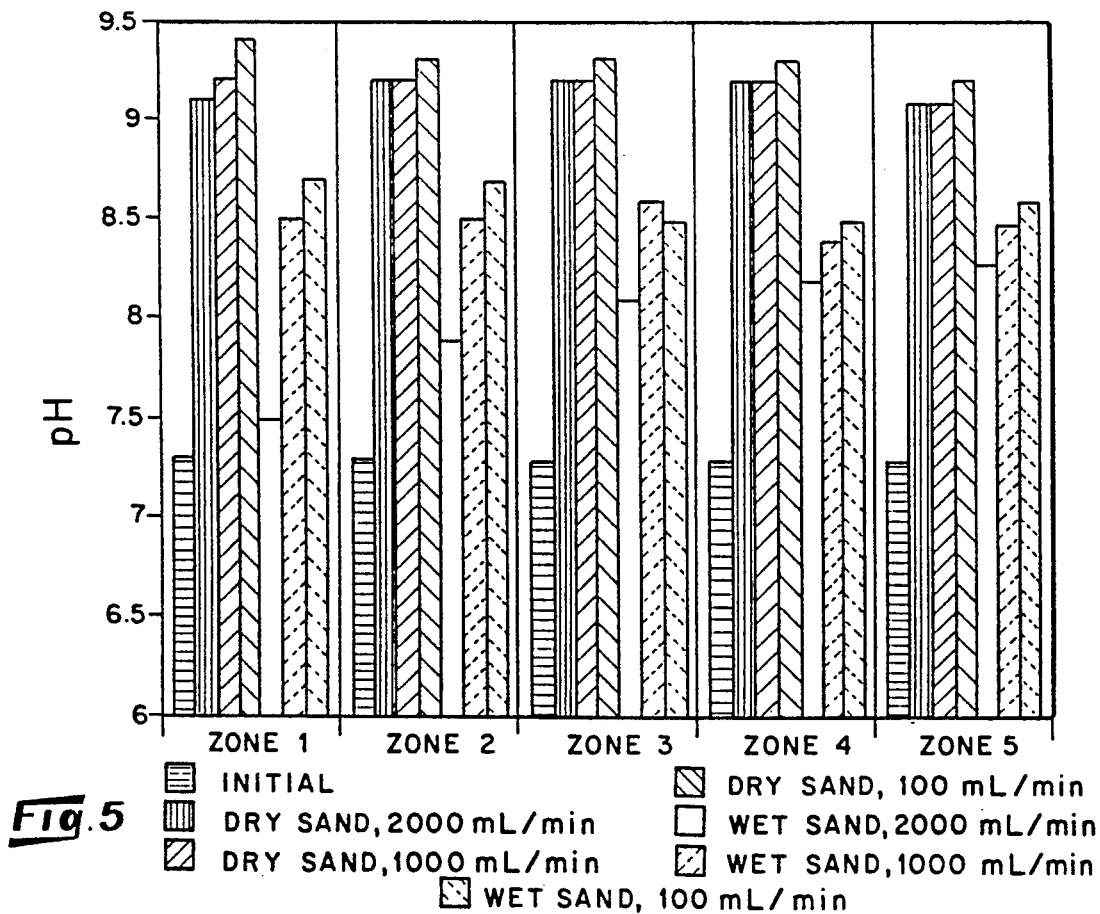
FIG. 5 is a graphical view illustrating various features of the invention related to the pH of the treated soils.

FIG. 5 shows the before and after pH measurements. The data of FIG. 5 indicate that the pH of the sand was affected by the ammonia delivery system. The pH change in the sand was less severe in moist sand. The initial pH of the sand was 7.3 and application of vapor-phase ammonia increased the pH to 7.5 to 8.7. While the upper end of this pH range is slightly high for bioremediation systems, it is not expected to cause severe operating difficulties.

Figure 6:
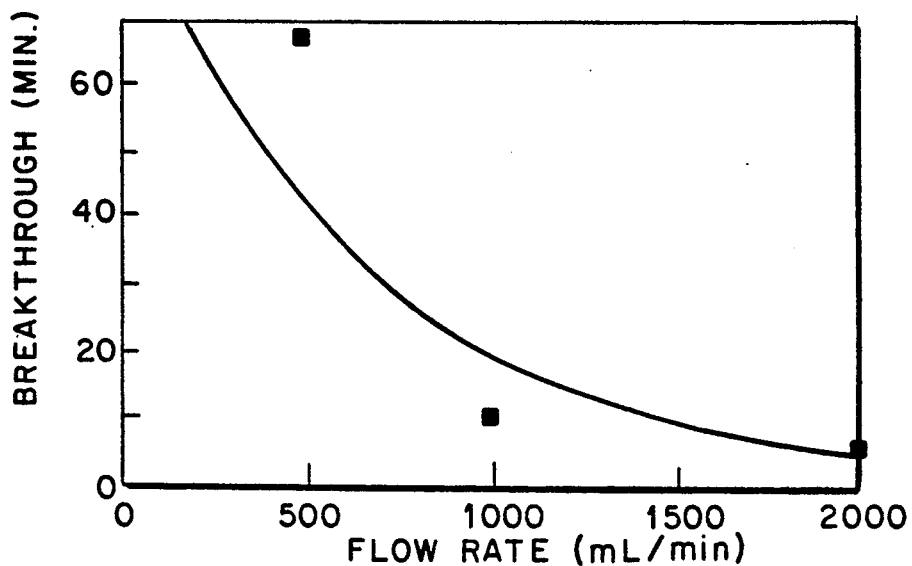
FIG. 6 is a graphical view illustrating a relationship between the time for breakthrough of vapor-phase ammonia and the flow rate of the gas for dry soils treated in accordance with the invention.
Figure 7:
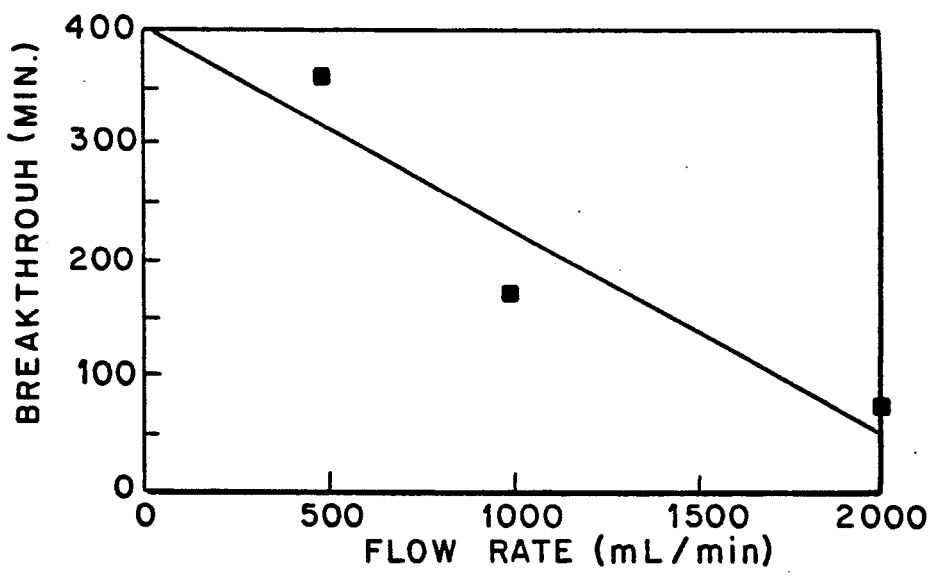
FIG. 7 is a graphical view illustrating a relationship between the time for breakthrough of vapor-phase ammonia and the flow rate of the gas for moist soils treated in accordance with the invention.

The retention time of ammonia in the sand columns is shown in FIGS. 6 and 7, with FIG. 6 depicting the breakthrough curve for dry sand and FIG. 7 depicting the breakthrough curve for wet sand. The data indicate that at faster flow rates, ammonia breakthrough occurs sooner. Also, the moisture content of the sand influenced the retention time of ammonia with breakthrough occurring much later for moist sand. FIGS. 8 and 9 depict the pore volumes of gas passed through the sand for dry and moist sand, respectively. The pore volumes required before breakthrough occurred were significantly increased when the sand contained 10% moisture.

EXAMPLE IV

The toxicity of gaseous ammonia, the utilization of ammonia, and the growth of microbial populations resulting from vapor-phase ammonia delivery in soil was examined using three columns filled with 10% moisture sand, two of which contained 0.2% glucose. A moist sand column and a glucose containing column were treated with air only, while the other glucose-containing column was treated with air which had been bubbled through a 10% ammonia solution. The microbial population density of the samples was determined before and after each test by a modified spread plate method as described in *Standard Methods For The Examination of Water and Waste Water*, 17 Ed. 1989.

Table 3 shows the initial microbial population density of the sand and of each column after five days of incubation in the presence of air or ammonia-laden air.

TABLE 3

Microbial Population Densities And Response To Ammonia Delivery in Moist Sand Columns

| Sample | Microbial Density Colony Forming Units/gm |
| --- | --- |
| Initial Microbial Density | $5 \times 10^6$ |
| Moisture and Air, Zone 1 | $2 \times 10^7$ |
| Moisture and Air, Zone 2 | $3 \times 10^6$ |
| Moisture and Air, Zone 3 | $4 \times 10^6$ |
| Moisture, glucose and Air, Zone 1 | $1 \times 10^8$ |
| Moisture, glucose and Air, Zone 2 | $2 \times 10^8$ |
| Moisture, glucose and Air, Zone 3 | $3 \times 10^6$ |
| Moisture, glucose and $NH_4$, Zone 1 | $4 \times 10^7$ |
| Moisture, glucose and $NH_4$, Zone 2 | $2 \times 10^7$ |
| Moisture, glucose and $NH_4$, Zone 3 | $9 \times 10^6$ |

As shown in Table 3, the glucose-free air treatment showed no change in microbial density. Both glucose containing treatments showed slight increases in total microbial densities. This data indicated that the addition of vapor-phase ammonia at a relatively high concentration was not toxic to the microorganisms.

Table 4 shows the removal of glucose from the same sand columns described above.

TABLE 4

Total Organic Carbon Content of Soil Columns Before and After Treatment

| Sample | Total Carbon (ppm) | Total Inorganic Carbon (ppm) | Total Organic Carbon (ppm) |
| --- | --- | --- | --- |
| Untreated Sand | 28 | 10 | 18 |
| Sand +0.2% Glucose | 2293 | 2 | 2291 |
| Moisture and Air, Zone 1 | 26 | 8 | 18 |
| Moisture and Air, Zone 2 | 26 | 11 | 15 |
| Moisture and Air, Zone 3 | 25 | 10 | 15 |
| Moisture, glucose and Air, Zone 1 | 747 | 4 | 743 |
| Moisture, glucose and Air, Zone 2 | 1617 | 2 | 1615 |
| Moisture, glucose and Air, Zone 3 | 1151 | 0 | 1151 |
| Moisture, glucose and $NH_4$, Zone 1 | 760 | 27 | 733 |
| Moisture, glucose and $NH_4$, Zone 2 | 467 | 29 | 437 |
| Moisture, glucose and $NH_4$, Zone 3 | 368 | 53 | 315 |

The data of Table 4 show that in general, the total organic carbon content of the glucose-amended sand was less in the treatment which received ammonia. Correspondingly, the inorganic carbon content was significantly higher in the ammonia-amended treatment suggesting increased biological activity.

Although the invention has been described in the foregoing in connection with several embodiments, it is to be understood that the descriptions herein are for purposes of illustration only and it is expected that the invention may take numerous forms and embodiments, and is subject to numerous rearrangements, modifications or substitutions without departing from the scope and spirit of the appended claims.

What is claimed is:

1. A method for in situ treatment of subsurface soil containing an organic contaminant which is metabolizable by microorganisms within the soil, the method comprising providing a delivery conduit in the soil from adjacent the surface to adjacent a treatment zone of the soil containing the microorganisms and the contaminant to establish flow communication between soil in the treatment zone and a source of a gas containing a vapor-phase microbial nutrient selected from the class consisting of vapor-phase ammonia and vapor-phase phosphates, and inducing a flow of the gas containing the vapor-phase microbial nutrient through the delivery conduit from the source such that the vapor-phase microbial nutrient is emitted into soil in the treatment zone from the conduit for utilization by microorganisms therein to promote the metabolism of the contaminant by the microorganisms.

2. The method of claim 1, further comprising providing an exhaust conduit in the soil from adjacent the surface so as to establish flow communication between the exhaust conduit and the adjacent soil for exhausting gas from the soil, establishing a vacuum in the exhaust conduit to provide an area of reduced pressure in the soil adjacent the exhaust conduit to create a zone of influence of the exhaust conduit in the soil and induce a flow of gas through soil in the zone of influence toward and into the exhaust conduit, and positioning the exhaust conduit with respect to the delivery conduit such that the zone of influence of the exhaust conduit encompasses at least a portion of the treatment zone to cause movement of gas emitted into the treatment zone from the delivery conduit toward and into the exhaust conduit.

3. The method of claim 1, wherein a flow of the gas containing the vapor-phase microbial nutrient through the delivery conduit is induced by applying a vacuum to an area of the soil adjacent the delivery conduit so as to cause a flow of the gas from the source, through the conduit and into the soil.

4. The method of claim 1, wherein a flow of the gas containing the vapor-phase microbial nutrient through the delivery conduit is induced by applying a pressure to the source so as to cause a flow of the gas from the source, through the conduit and into the soil.

5. The method of claim 1, wherein the delivery conduit is oriented generally vertically and a plurality of delivery conduits are provided in spaced relation about a centrally located exhaust conduit for exhausting vapors from the treatment zone and wherein a flow of the gas containing the vapor-phase microbial nutrient through the delivery conduits is induced by applying a pressure to the source to cause a flow of the gas from the source, through the delivery conduits and into the treatment zone and at least a portion of the gas emitted from the delivery conduits is withdrawn from the treatment zone by applying a vacuum to the exhaust conduit to induce a flow of gas through the treatment zone into the exhaust conduit.

6. The method of claim wherein the gas containing the vapor-phase nutrient is provided by contacting the gas with a solution containing a compound that in dissolved form in the solution liberates the nutrient in vapor form to the gas contacting the solution.

7. The method of claim 1, further comprising inducing a flow of the gas emitted from the delivery conduit through the treatment zone to an exhaust conduit wherein the gas is removed to the surface, and thereafter treating the gas to remove any residual vapor-phase nutrient contained therein and to render the gas in acceptable condition for discharge to the environment.

8. The method of claim 1, further comprising inducing a flow of the gas emitted form the delivery conduit through the treatment zone to an exhaust conduit wherein the gas is removed to the surface, and thereafter recirculating at least a portion of the gas from the exhaust conduit to the delivery conduit.

9. A method for in situ treatment of subsurface soil containing an organic contaminant which is metabolizable by microorganisms within the soil, the method comprising providing a delivery conduit in the soil from adjacent the surface to adjacent a treatment zone of the soil containing the microorganisms and the contaminant to establish flow communication between soil in the treatment zone and a source of a gas containing a vapor-phase microbial nutrient selected from the class consisting of vapor-phase ammonia and vapor-phase phosphate compounds, providing an exhaust conduit in the soil from adjacent the surface so as to establish flow communication between the exhaust conduit and the soil for withdrawal of gas from the soil, inducing a flow of the gas containing the vapor-phase microbial nutrient through the delivery conduit from the source such that the vapor-phase nutrient is emitted into the treatment zone from the delivery conduit for utilization by the microorganisms therein to promote the metabolism of the contaminant by the microorganisms, establishing a vacuum in the exhaust conduit so as to provide an area of reduced pressure in the soil adjacent the exhaust conduit to create a zone of influence of the exhaust conduit in the soil and induce a flow of gas through soil in the zone of influence toward and into the exhaust conduit, and positioning the exhaust conduit with respect to the delivery conduit such that the zone of influence of the exhaust conduit encompasses at least a portion of the treatment zone to cause movement of gas emitted from the delivery conduit into the treatment zone toward and into the exhaust conduit.

10. An apparatus for in situ treatment of subsurface soil containing an organic contaminant which is metabolizable by microorganisms within the soil, the apparatus comprising delivery conduit means in the soil extending from adjacent the surface to adjacent a treatment zone of the soil containing the microorganisms and the contaminant, said delivery conduit means configured to establish flow communication between soil in the treatment zone and a source of a gas containing a vapor-phase microbial nutrient selected from the class consisting of vapor-phase ammonia and phosphate compounds, and means for inducing a flow of said gas containing said vapor-phase microbial nutrient through said delivery conduit means from said source such that said vapor-phase microbial nutrient is emitted from said delivery conduit means into soil in the treatment zone for utilization by the microorganisms therein to promote the metabolism of the contaminant by the microorganisms.

11. An apparatus for in situ treatment of subsurface soil containing an organic contaminant which is metabolizable by microorganisms within the soil, the apparatus comprising vapor delivery conduit means in the soil extending from adjacent the surface to adjacent a treatment zone of the soil containing the microorganisms and the contaminant for establishing flow communication between soil in the treatment zone and a source of a gas containing a vapor-phase microbial nutrient selected from the class consisting of vapor-phase ammonia and phosphate compounds, vapor exhaust conduit means for establishing flow communication between soil in the treatment zone and said vapor exhaust conduit means for withdrawing vapors from the soil, means for inducing a flow of said gas containing said vapor-phase microbial nutrient through said delivery conduit means from said source such that the vapor-phase nutrient is emitted from said vapor delivery conduit means into soil in the treatment zone for utilization by the microorganisms therein to promote the metabolism of the contaminant by the microorganisms, means for establishing a vacuum in said exhaust conduit means so as to provide an area of reduced pressure in soil adjacent said exhaust conduit means to create a zone of influence of said exhaust conduit means in the soil and induce a flow of vapors through soil in the zone of influence toward and into said exhaust conduit means, and said exhaust conduit means being positioned with respect to said delivery conduit means such that the zone of influence of said exhaust conduit means encompasses at least portion of the treatment zone to cause movement of vapors emitted from said delivery conduit means into the treatment zone toward and into said exhaust conduit means.

* * * * *